United States Patent [19]

Presto

[11] 4,328,642
[45] May 11, 1982

[54] PLASTIC DOOR FOR AN AUTOMOBILE
[75] Inventor: Douglas A. Presto, Bensalem, Pa.
[73] Assignee: The Budd Company, Troy, Mich.
[21] Appl. No.: 157,460
[22] Filed: Jun. 9, 1980
[51] Int. Cl.³ .............................................. B60J 5/04
[52] U.S. Cl. ..................................................... 49/502
[58] Field of Search ................. 49/502, 503, 501, 374; 296/146

[56] References Cited
U.S. PATENT DOCUMENTS 2,797,130  6/1957  Renno .................................... 49/502
3,370,384  2/1968  Hafer et al. ........................... 49/502
3,782,036  1/1974  Clark et al. ........................... 49/502
3,868,141  2/1975  Johnson ............................. 49/502 X Primary Examiner—Philip C. Kannan
Attorney, Agent, or Firm—A. L. Trueax, Jr.

[57] ABSTRACT

A plastic door comprises inner and outer plastic panels. A metal window frame includes a high strength intrusion beam secured thereto. The outer panel is secured to the inner panel with the window frame disposed within the two panels. Hinge and latch elements may be connected to the metal frame through the inner panel.

4 Claims, 3 Drawing Figures

PLASTIC DOOR FOR AN AUTOMOBILE

BACKGROUND OF THE INVENTION

Plastic doors for automobiles have been used and are desirable because of their light weight. While it would be desirable to make doors completely out of plastic, this is impractical because the upper door frame including the window area would lack sufficient ridigity. Therefore, the door frame including the window must generally be made of high strength material, such as steel or other metal.

When the door frame is made of metal, such as steel, the problem of attaching the door frame to the rest of the plastic door arises. The attachment problem is compounded by the fact that a door side intrusion beam must also be provided for protection against side impacts.

OBJECTS OF THE INVENTION

It is an object of this invention to provide an improved door of increased strength for an automobile.

It is a further object of this invention to provide an improved plastic door wherein the outer and inner plastic panels may be made separately and attached to a separate door frame assembly which includes the door beam and is adapted to receive latch and hinge members.

BRIEF SUMMARY OF THE INVENTION

In accordance with the present invention, an automobile door comprises outer and inner panels made of plastic. A metal door frame assembly is provided having a door side intrusion beam connected thereto. The door frame is secured to the outer panel with the intrusion beam being secured by suitable adhesive means. The outer panel is then attached to the inner panel with the window frame disposed within the two panels. Hinge and latch elements are connected to the frame through the sides of the inner panel structure.

Other objects and advantages of the present invention will be apparent and suggest themselves to those skilled in the art, from a reading of the following specification and claims, taken in conjunction with the accompanying drawings, in which:

DETAILED DESCRIPTION OF THE PREFERRED EMBODIMENTS

Figure 1:
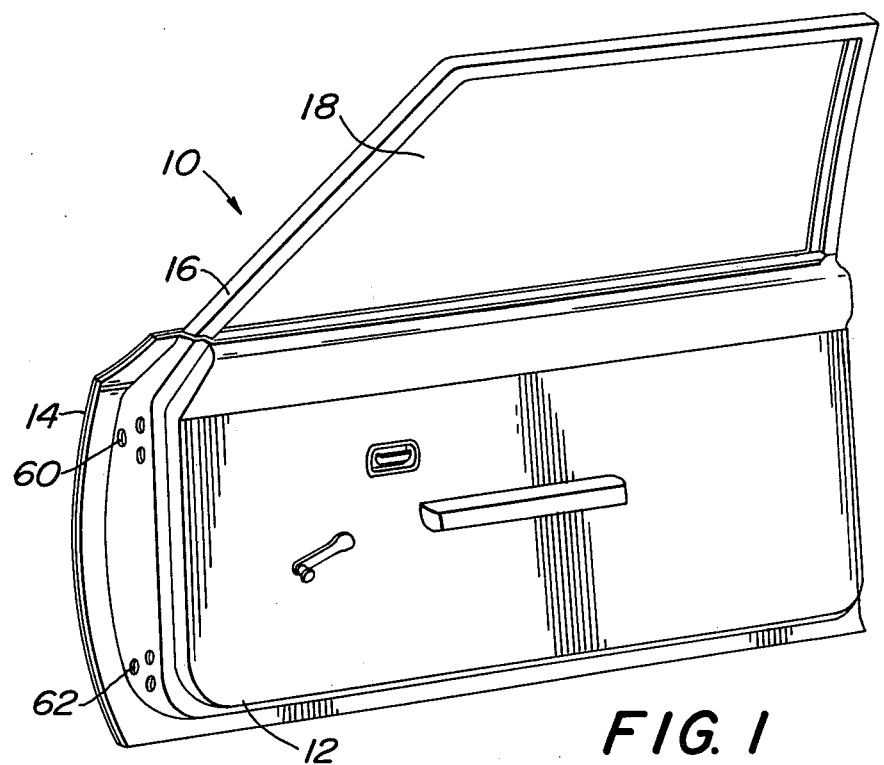
FIG. 1 is an isometric view of an assembled plastic door for an automobile, in accordance with the present invention.

Referring to the drawings, FIG. 1 illustrates an assembly automobile door 10. The door 10 includes an inner panel 12, an outer panel 14 and a window frame 16. The bottom portion of the window frame is disposed within the area between the two panels 12 and 14. The upper portion of the window frame 16 extends upwardly above the two panels 12 and 14 and provides a window area 18. The door 10 includes many of the conventional elements found in an automobile. Because most of these elements are well known and not related to the present invention, they are not illustrated or described in detail.

Figure 2:
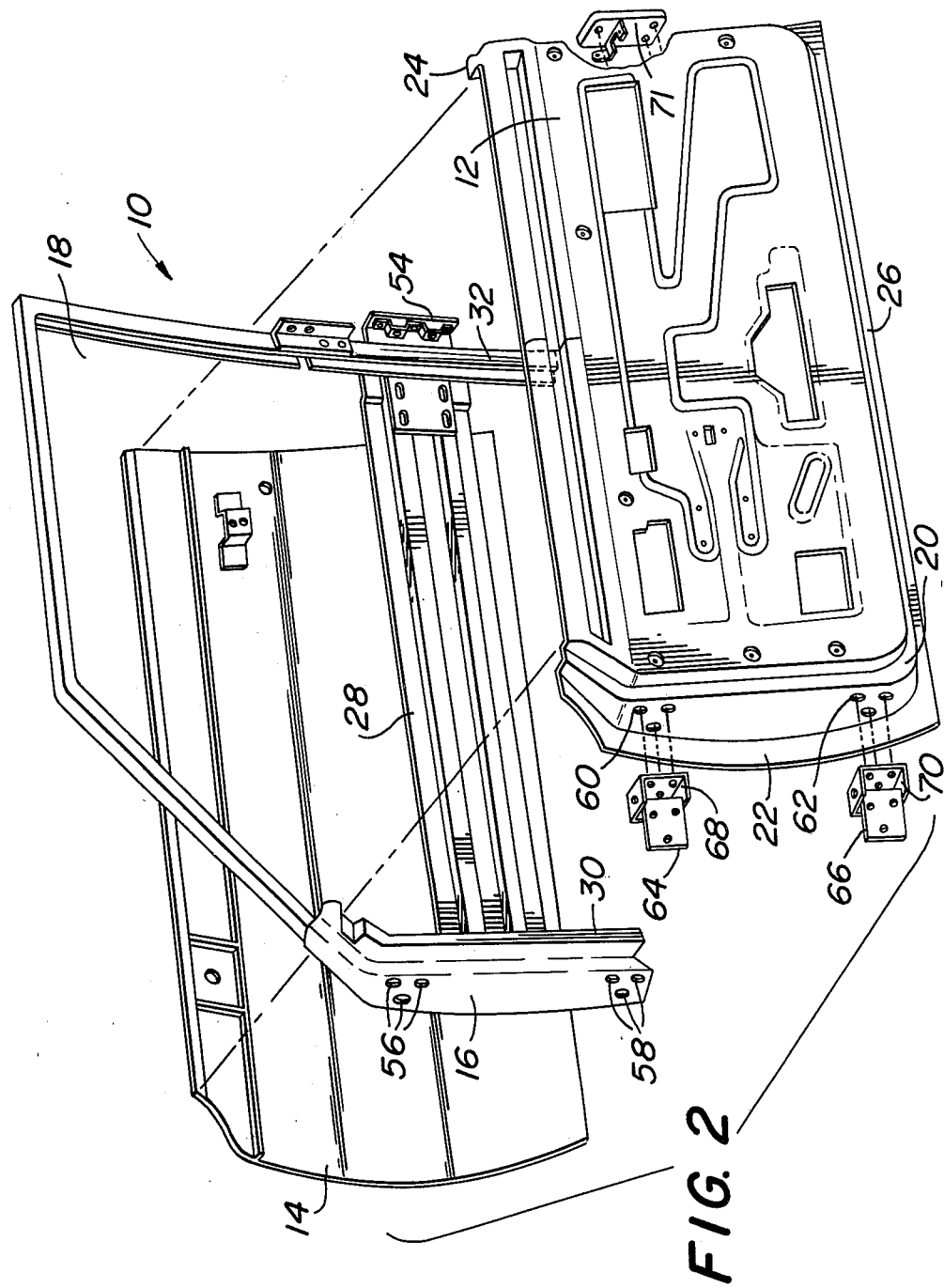
FIG. 2 is an exploded view illustrating the outer and inner panels with the window frame assembly in accordance with the present invention.

Referring to FIG. 2 the inner panel 12 may be made of fiberglass reinforced plastic material molded or stamped to the desired shape. The inner panel 12 is shaped and includes openings therein to receive hardware, such as locks, handles and window mechanisms normally associated with an automobile door. The outer panel 14 is also a molded or stamped light weight plastic piece made of reinforced fiberglass or other suitable plastic material.

The inner panel 12 includes an inwardly extending section 20 which provides an enclosed area on the two sides and bottom of the panel while being open at the top to permit the door frame to extend upwardly to provide the window area. The bottom portion of the frame 16 is dimensioned to fit into the enclosed area provided by the section 20. The outer side edge 22, 24 and bottom edge 26 are disposed to engage the side and bottom edges of the outer panel 14. The edges of the inner and outer panels are secured together by a suitable adhesive with the door frame disposed therebetween.

An important feature of the present invention relates to the attachment of an intrusion resistance door beam 28 to the bottom portion of the frame 16. The door beam 28, which may be bent to molded or stamped with channels therein for increased strength, extend across the door and connected to downwardly extending arms 30 and 32 of the frame 16. The beam 28 may be of high strength reinforced plastic material for light weight or in some cases may be metal. Heretofore, as far as is known, the beam 28 was generally directly attached to the outer panel during the assembly operation. This produced problems in attaching the inner and outer panels together. By making the door side intrusion beam 28 as part of the door frame 16, an effective way is provided for combining the inner metal parts to the plastic panels.

Figure 3:
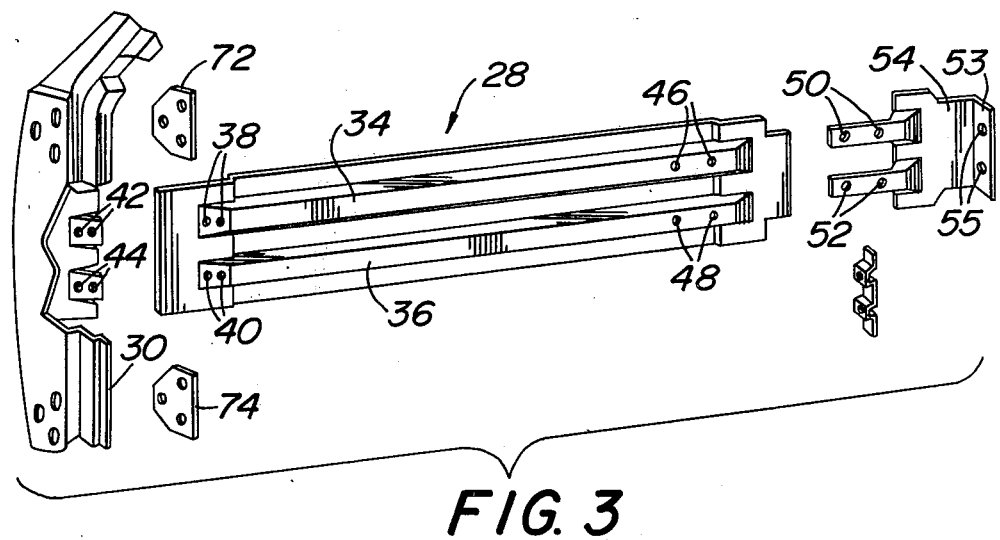
FIG. 3 is an exploded view illustrating portions of the window frame assembly with the door beam in accordance with the present invention.

Referring to FIG. 3, along with FIG. 2, the beam 28 comprises a pair of channels 34 and 36 formed therein. The ends of the channels 34 and 36 include openings 38 and 40, respectively, adapted to be aligned with openings 42 and 44 which are included in protruding sections of the leg 30. The openings 38 and 40 are adapted to be aligned with openings 42 and 44 to permit the beam 28 to be suitably secured to the leg 30 of the frame 16. Screws and nuts, not illustrated, may be used to secure the beam 28 to the frame 16.

The opposite end of the channels 34 and 36 also includes openings 46 and 48 adapted to be aligned with openings 50 and 52. The openings 50 and 52 are disposed in an element 54 mounted to the leg 32 of the frame 16. The beam 28 is mounted to the element 54 through the opening by means of suitable nuts and screws, not illustrated.

FIG. 3 illustrates that the beam 28 may be securely mounted to the window frame 16 by relatively simple and convenient means prior to the assembly of the inner and outer panels. The frame 16 includes all the mechanical openings necessary to provide attachments or hardware such as hinges and latches. The frame 16 comprises a rigid structure necessary for the door while still permitting the use of relatively light weight inner and outer plastic panels. In addition, the intrusion beam may be of fiberglass material for high strength and light weight. At the same time, the door frame is particularly adapted to receive and facilitate the final assembly of the inner and outer panels.

Referring to FIG. 2, frame 16 includes a plurality of openings 56 and 58. They are designed to be aligned with openings 60 and 62 in one side of the inner panel 12. The first step in the assembly of the door 10 comprises securing the inner panel to the frame 16 with the intrusion beam 28. The inner panel 12 is inserted over the frame 16 with the openings 56 and 58 aligned with the openings 60 and 62. On the other side of the inner panel, there are provided similar openings (not illustrated) adapted to align with openings in connecting member 54. With the panel 12 disposed over the frame 16, hinge members 64 and 66 having openings 68 and 70, respectively, are ready to be inserted onto the subassembly. Screws and nuts are adapted to be inserted through the openings in the hinge members 64 and 66 and the openings 60 and 62 in the inner panel 12 and the openings 56 and 58 of the leg 30 of the frame 16. The hinge members 64 and 66 are therefore readily secured to the strong metal inner frame by the means illustrated.

In like manner, a latching mechanism 71 is adapted to be connected through openings (not illustrated) in the right edge 24 of the inner panel 12. The latching mechanism 71 is connected to the member 54 by suitable means such as nuts or screws.

The final step in the assembly of the door 10 involves the placing of the outer panel 14 against the edges of the inner panel 12 and securing them together by a suitable adhesive well known to those skilled in the art.

The present invention has thus provided a means to produce plastic door of relatively light weight while still maintaining the strength needed for the window structure and for side intrusions. Placing of the beam on the door frame prior to the final assembly of the panels facilitates the manufacture and assembly of the door illustrated. The particular arrangement of the opening in the inner panel and the frame 16 makes it possible to connect the hinges and latch mechanisms to the strongest points in the door. It is important that these elements be connected to the strong points in the door because they must withstand relatively high stresses and cannot be connected directly to plastic members.

What is claimed is:

1. An automobile door comprising:
   (a) an outer panel made of plastic;
   (b) an inner panel made of plastic;
   (c) an assembly comprising a metal door frame and a door beam;
   (d) said metal door frame including an upper cross member and two downwardly extending leg sections for receiving latch and hinge elements, said door frame having the lower portions of said leg sections positioned between said outer and inner panels having one leg extending along the front edge of said door and the other leg extending along the rear edge of said door and said upper portions of said legs cooperating with said upper cross member for forming an open window area above and between said panels;
   (e) said door beam being connected to said lower portions of said downwardly extending leg sections between said inner and outer panels and outwardly of the window area; and
   (f) means for attaching said outer and inner panels to the legs of said door frame with said door beam between said inner and outer panels including hinge members positioned outside said panels for cooperating with one of said legs positioned inside said panel member and a latching member positioned outside said panels for cooperating with the other of said legs positioned inside said panels whereby portions of said panels are sandwiched between said frame and said hinge members and said latching member.

2. An automobile door as set forth in claim 1 wherein said door beam comprises a fiberglass member.

3. An automobile door as set forth in claim 1 wherein said door beam is mechanically attached to the legs of said door frame and adhesively bonded to said outer panel.

4. An automobile door as set forth in claim 3 wherein said inner panel includes inwardly extending sections disposed to be adhesively bonded to the side and bottom edges of said outer panel and providing an area therein to house the bottom portions including the legs of said frame members.

* * * * *